United States Patent [19]

Sakata et al.

[11] Patent Number: 4,875,839

[45] Date of Patent: Oct. 24, 1989

[54] SCROLL MEMBER FOR USE IN A POSITIVE DISPLACEMENT DEVICE, AND A METHOD FOR MANUFACTURING THE SAME

[75] Inventors: Hirotsugu Sakata, Chigasaki; Hiroaki Murasaki, Yokohama; Makoto Hayano, Tokyo; Hitoshi Hattori; Naoya Morozumi, both of Yokohama; Kouichi Yoneyama, Chigasaki; Isao Suzuki, Tokyo; Junji Sone, Yokohama; Shigemi Nagatomo, Tokyo, all of Japan

[73] Assignee: Kabushiki Kaisha Toshiba, Kawasaki, Japan

[21] Appl. No.: 170,354

[22] Filed: Mar. 18, 1988

[30] Foreign Application Priority Data

Mar. 20, 1987 [JP] Japan .................................. 62-64316
Sep. 30, 1987 [JP] Japan .................................. 62-243993
Dec. 4, 1987 [JP] Japan .................................. 62-305721

[51] Int. Cl.$^4$ .......................... F01C 1/04; F04C 18/04; B28B 1/24; B28B 7/18
[52] U.S. Cl. ......................................... 418/55; 418/56; 29/156.8 R; 264/250; 264/255; 264/293
[58] Field of Search .................. 418/55 A, 56, 162; 29/156.4 R, 156.8 R; 264/250, 255, 293; 164/98

[56] References Cited

U.S. PATENT DOCUMENTS

| | | | |
|---|---|---|---|
| 2,841,089 | 7/1958 | Jones | 418/55 A |
| 4,487,560 | 12/1984 | Uchikawa et al. | 418/55 A |
| 4,558,997 | 12/1985 | Sakata et al. | 418/55 |
| 4,673,339 | 6/1987 | Hayano et al. | 418/15 |
| 4,696,630 | 9/1987 | Sakata et al. | 418/55 |
| 4,708,607 | 11/1987 | Hayano et al. | 418/55 |

FOREIGN PATENT DOCUMENTS

| | | | |
|---|---|---|---|
| 59-135309 | 8/1984 | Japan. | |
| 60-8493 | 1/1985 | Japan. | |
| 61-197782 | 9/1986 | Japan | 418/55 A |

*Primary Examiner*—John J. Vrablik
*Attorney, Agent, or Firm*—Cushman, Darby & Cushman

[57] ABSTRACT

A scroll member comprising a metallic end plate having a spiroidal groove on one side thereof, and a through-hole communicating with the groove, and a resin wrap joined to the groove of the end plate so as to protrude from the surface of the end plate. The wrap being formed by injection molding, and the through-hole and the groove being filled with part of the wrap.

19 Claims, 5 Drawing Sheets

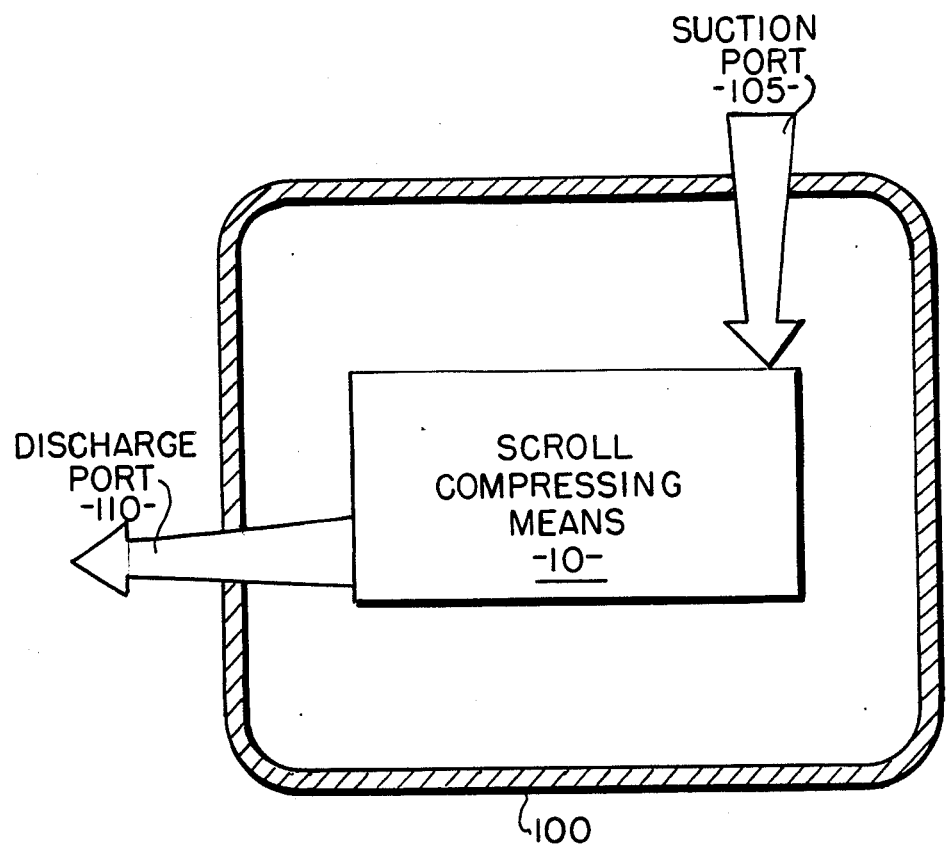
F I G. 12

SCROLL MEMBER FOR USE IN A POSITIVE DISPLACEMENT DEVICE, AND A METHOD FOR MANUFACTURING THE SAME

BACKGROUND OF THE INVENTION

1. Field of the Invention

The present invention relates to a scroll member used in a positive displacement device, such as a compressor, pump or expander, and a method for manufacturing the scroll member.

2. Description of the Related Art

In a positive displacement device, e.g., a scroll compressor, processes of suction, compression, and discharge can be executed simultaneously in a plurality of chambers. Accordingly, driving torque fluctuates only slightly, the level of noise or vibration during operation if low, and the compression efficiency is improved. Thus, the scroll compressor may be utilized for gas compression in the cooling system of refrigerators or freezers, and in the air-conditioning system of air conditioners, etc.

In the scroll compressor, a scroll compressing unit is disposed in an airtight housing, and gas is introduced into the unit to be compressed and discharged thereby. The scroll compressing unit comprises a pair of scroll members in lubricative contact with each other; a stationary scroll member fixed to the housing and a orbiting scroll member orbiting relatively to the stationary member. Each scroll member has a substantially circular end plate and a spiroidal wrap planted in one side of the end plate. Usually, the spiroidal configuration of the wrap is either an involute curve or a continuous curve determined by a plurality of circular arcs (that is series semi-circle curve), so that the respective wrap-side faces of the two scroll members are in contact with each other simultaneously at a plurality of contact areas when the scroll members are joined together. The respective wraps of the two scroll members have the same height so that the end faces of the wraps abut against the end plates opposite thereto. Thus, when the scroll members are combined together, a plurality of crescent-shaped compression chambers are defined by the wraps and the end plates.

When the scroll compressor is operated, the orbiting scroll member orbits relatively to the stationer scroll member, so that the sliding-contact portions between the side faces of the wraps move successively from the peripheral edge portion toward the central portion. As a result, the crescent-shaped compression chambers are reduced in capacity, so that the gas in the chambers is compressed. The compressed gas is discharged from the housing through a discharge port in the center of the end plate.

The end plate and the wrap are made from forgings or die castings, by machining the forgings or die castings by means of an NC cutting machine into products having predetermined sizes. This method of manufacturing the end plate and the wrap requires great cost, and cannot be employed to manufacture the end plate and the wrap in large quantities. This is why the use of this method has been limited to the manufacture of the end plates and the wraps for use in large-capacity compressors.

To manufacture the end plate of the scroll member at low cost, the end plate can be made of steel or aluminum, and a spiroidal groove can be cut in one surface of the end plate. In this case, the wrap is fitted in the spiroidal groove, thereby forming the scroll member. However, this method has a problem. The wraps of both scroll members must be in oil-sealed contact, and the end of either wrap must also be in oil-sealed contact with the end plate. For example, the gap between the contacting sides of the wraps must be reduced to 10 $\mu$m or less, in order that the gas leakage from the compression chamber is minimized and, hence, the compressor has a sufficient compression efficiency. Therefore, the allowable tolerance of either scroll member must be 5 $\mu$m or less, and the components of either scroll member must be scraped with an extremely high precision.

However, in above-mentioned method for manufacturing, it is hard to form the groove in the end plate with high accuracy, so that a desired working accuracy cannot be obtained. It is also difficult to fit the wrap accurately into the groove, so that the gap between the adjacent turns of the wrap is prone to errors. Accordingly, the mounting accuracy for the wrap becomes so low that the compressed gas is liable to leak from chambers, thus failing to enjoy high compressibility. In such scroll member of the wrap-fit type, moreover, the formation of the groove in the end plate requires much labor, thereby entailing increase in manufacturing cost.

In consideration of these circumstances, an improved forming technique has been developed. In this method, a wrap and an end plate are formed integrally, instead of being formed separately. Disclosed in Japanese Patent Disclosure No. 59-135309 is an integral forming method in which a scroll member is integrally formed by injection molding of synthetic resin using metallic mold. According to this method, a wrap and an end plate are formed integrally, so that the scroll member can be manufactured quickly. Since the scroll member has a complicated configuration, and is usually designed so that the wrap is thinner than the end plate, so the individual parts of the member are subject to differences in contraction rate during a process of solidification. Thus, the scroll member is warped, and the desired working accuracy cannot be obtained.

Disclosed in Japanese Utility Model Disclosure No. 60-8493, moreover, is a scroll member of a type such that a spiroidal core, which protrudes from one side of an end plate, is coated with resin by injection molding.

In the scroll member of this type, however, the resin is injected through a passage on the mold side, so that its finally solidifying portion is situated on the end-face (or top) side of a wrap. Due to differences in contraction rate, therefore, the core cannot be coated as required, so that the shape of the wrap, especially of its end face, is lowered in accuracy. Since an injection hole and a vent hole of a mold opens corresponding to the wrap end face burrs are formed on the end face, when these burrs are removed by scraping the precision of the wrap the end face, is impaired.

In general, the wrap end face is liable to wear when it slides on the other end plate. In order to prevent the gas from being by-passed, it is to be desired that no gap should exist between the contact portions of the wrap end face and the end plate. I the scroll member, furthermore, the working accuracy of wraps is so low that the wraps and the end plates wear much by unbalance sliding. Thus, the scroll member is lowered in life performance.

SUMMARY OF THE INVENTION

The present invention has been contrived in consideration of these circumstances, and has an object to provide a high-performance scroll member having high-accuracy wraps and capable of high-efficiency compression.

Another object of the invention is to provide a method for manufacturing a scroll member, capable of forming a high-accuracy wrap easily and quickly.

A scroll member according to the present invention comprises a metallic end plate having a spiroidal groove on one side thereof, and a through-hole communicating with the groove, and a resin wrap joined to the groove of the end plate so as to protrude from the surface of the end plate, the wrap being formed by molding and the through-hole and the groove being filled with part of the wrap.

A method for manufacturing a scroll member according to the present invention comprises forming a spiroidal groove on one side of an end plate, setting the end plate in mold means for defining the shape of a wrap, and injecting resin into the groove from the end-plate side, thereby molding the wrap.

Preferably, in this case, the end plate is formed with a passage connecting the groove and the opposite side to the grooved surface thereof, so that the resin is injected into the groove through the passage. Preferably, moreover, a passage for deflation is provided separately from the connecting passage.

The cross-sectional shape of the groove may be square, trapezoid or the other. Preferably, in this case, the width of the bottom portion of the groove is greater than that of its opening portion.

Preferably, furthermore, the wrap is formed of a resin which is particularly high in strength, lubricity, wear resistance, heat resistance, and durability. More specifically, the wrap is preferably formed of a super-engineering plastic such as liquid-crystal polymer resin (LCP resin).

The end plate, which is in sliding contact with the wrap, is preferably made of an alloy which essentially consists of iron, brass, or aluminum, and is strong, and slides well on the wrap when lubricated with oil. If a deep groove is needed, the end plate is preferably formed by pasting a plurality of sheets, each having a recess and a projection, together. Alternatively, moreover, the end plate may be formed by injection molding of resin, without using metal.

BRIEF DESCRIPTION OF THE DRAWINGS

FIG. 12 depicts the scroll compressing unit within the hermetically sealed housing.

DETAILED DESCRIPTION OF THE PREFERRED EMBODIMENTS

Various embodiments of the present invention will now be described in detail with reference to the accompanying drawings.

Figure 1:
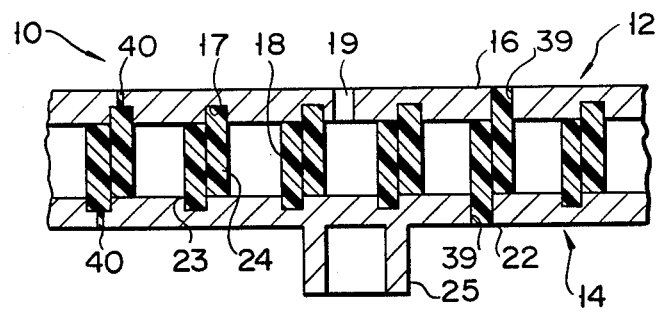
FIG. 1 is a longitudinal sectional view showing an assembly composed of a stationary scroll member and an orbiting scroll member according to a first embodiment of the present invention.

As shown in FIG. 1 and 12, scroll compressing unit 10 according to a first embodiment, which is composed of a combination of stationary scroll member 12 and orbiting scroll member 14, is disposed in the heremetically housing sealed 100, having a discharge part 110 and a suction port 105, of a scroll compressor so that the axis of unit 10 is directed vertically. Stationary scroll member 12 is fixed to the housing, and orbiting scroll member 14 is in contact with the lower portion of member 12. Boss 25 is formed on the rear face of member 14. An orbiting drive mechanism is coupled to boss 25 by means of a crank shaft (not shown).

End plates 16 and 22 of scroll members 12 and 14 are each in the form of a substantially circular metal plate. Spiroidal grooves 17 and 23 are formed on the one-side faces of members 12 and 14, respectively. Spiroidal wraps 18 and 24 are planted in grooves 17 and 23, respectively, so as to protrude from the respective one-side faces of end plates 16 and 22 at right angles thereto. Wraps 18 and 24 are obtained by forming a super-engineering plastic (resin particularly high in strength, lubricity, wear resistance, heat resistance, and durability), such as liquid-crystal polymer resin, by injection molding. In this case, the width of grooves 17 and 23 is substantially equal to that of wraps 18 and 24.

Figure 5:
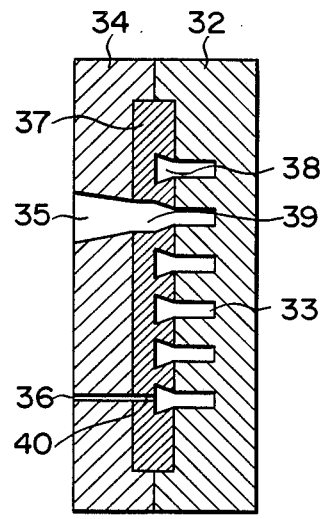
FIG. 5 is a longitudinal sectional view showing a modification of the first embodiment.

The cross-sectional shape of the grooves can be varied. As shown in FIG. 5, for example, groove 38 of end plate 37 may be formed by two steps of pressing work so that its bottom portion is wider than its opening. The junction of the wrap and the end plate can be further strengthened by shaping groove 38 like this.

Wraps 18 and 24 have substantially the same shape, and are designed so that the respective end faces of wraps 18 and 24 abut against end plates 22 and 16, respectively, when scroll members 12 and 14 are joined together with their wrap-side faces opposed to each other. The respective side faces of wraps 18 and 24 are in contact with each other at a plurality of positions. Thus, crescent-shaped compression chambers are defined between end plates 16 and 22 and wraps 1B and 24. A hole 19 is bored through the center of stationary scroll member 12 so that compressed gas is discharged to the outside through hole 19.

Figure 3:
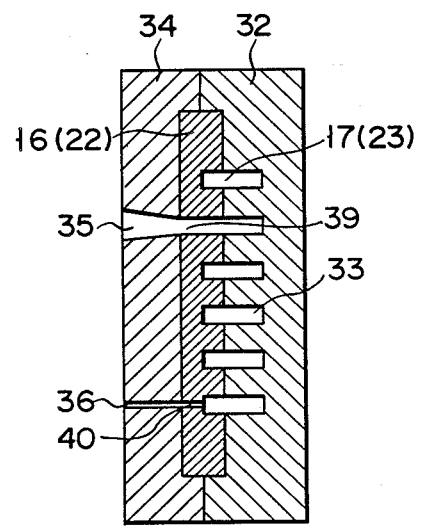
FIG. 3 is a longitudinal sectional view of an end face set in mold, illustrating a method for manufacturing the scroll member according to the first embodiment.
Figure 4:
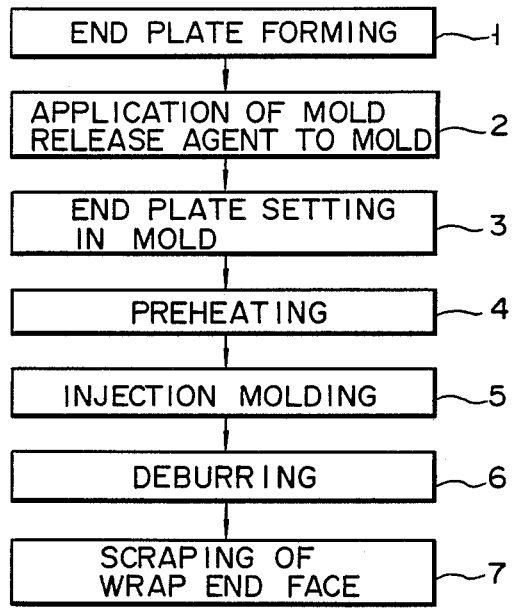
FIG. 4 is a diagram for illustrating processes for manufacturing the scroll member.

Referring now to FIGS. 3 and 4, a method for manufacturing the scroll member will be described.

A disk with a diameter of about 75 mm is cut out from a steel sheet with a thickness of about 6 mm, and holes for injection and deflation are bored through proper portions of the disk. Groove 17 (23), having the shape of an involute curve or a series semi-circle curve, is formed in one-side surface of the disk by die forging (step 1).

A mold release agent is applied to groove 33 of metallic mold half 32 (step 2). The mold release agent need not be applied, when the inner surface of groove 33 is sufficiently smooth, or when the resin injected is of such type that can easily released from the mold when solidified.

End plate 16 (22) molded in step 1 is fitted into mold half 32 so that its groove 17 (23) is in alignment with groove 33 of mold half 32. Then, the other mold half 34 is put on end plate 16 (22) so that the holes 39, 40 for injection and deflation of the end plates are in alignment with injection hole 35 and vent hole 36 of mold half 34, respectively. Mold 32 and 34 are bound together by means of restriction means to prevent disengagement (step 3).

Mold 32 and 34 are preheated to a predetermined temperature (step 4).

A gate of an injection-molding machine is connected to injection hole 35, and molten LCP resin liquid-crystal polymer resin) is injected into grooves 17 (23) and 33 (step 5).

After the resin is solidified, mold 32 and 34 are unbound, end plate 16 (22) is taken out from mold 32 and 34, and burrs are removed from holes 35 and 36 (step 6).

Figure 2:
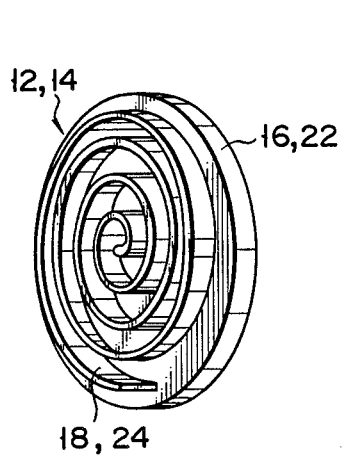
FIG. 2 is a perspective view of the scroll member as taken from the wrap side.

The end face of the wrap is finish-ground to improve its evenness (step 7). Thus, scroll member 12 (14), as shown in FIG. 2, is completed such that the thickness, height, and space (gap) of wrap 18 (24) are 3 mm, 10 mm, and 8 mm, respectively.

According to the first embodiment described above, the resin is injected from the groove side of the end plate, so that its finally solidifying portion is situated at the root portion of the wrap. Practically, therefore, the shape of the wrap is not influenced by local contraction. Thus, the scroll member can be finished with high accuracy, so that the duty of the grinding work afterward can be lightened. Since no fins are produced on the end face of the wrap, the accuracy of the wrap can be prevented from being lowered by deburring. The special resin for use as the wrap material is highly lubricant against metal. Therefore, the friction loss of the wraps by their sliding action can be made smaller than when the wrap are made of metal.

Figure 6:
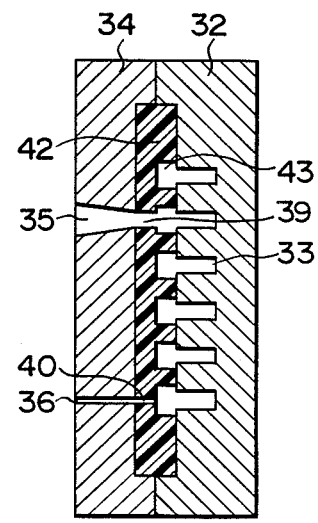
FIG. 6 is a longitudinal sectional view of an end face set in mold, illustrating a method for manufacturing a scroll member according to a second embodiment of the invention.

Referring now to FIG. 6, a second embodiment of the present invention will be described. A description of those portions or components which are used in common in the first and second embodiments is omitted herein.

In this second embodiment, end plate 42 is made of resin. End plate 42 has been fabricated by injection molding, and a wrap is then formed by injecting the resin into groove 43 of the end plate. The width of groove 43 is made wider than that of groove 33 used to form the wrap. End plate 42 can be made of a metal, instead of resin.

According the second embodiment described above, the end plate and the wrap are formed separately by injection molding, so that the shapes of the individual components to be molded are simple, and each component has a uniform thickness. Accordingly, the scroll member is subject to less deformation than in the case of integral injection molding. Since contraction of the resin can be absorbed the modified groove for the wrap, moreover, the wrap can be formed with higher accuracy. Furthermore, that part of the end plate corresponding to the location of the groove is melted by heat from the molten resin, so that the wrap and the end plate can be bonded more firmly to each other.

Figure 7:
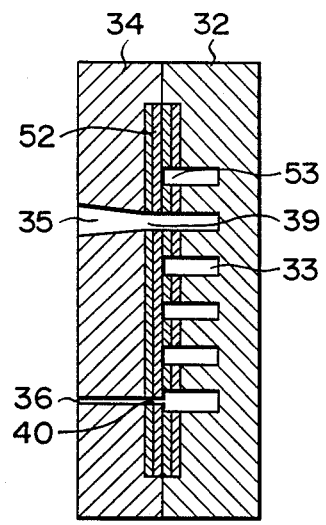
FIG. 7 is a longitudinal sectional view of an end face set in mold, illustrating a method for manufacturing a scroll member according to a third embodiment of the invention.
Figure 10:
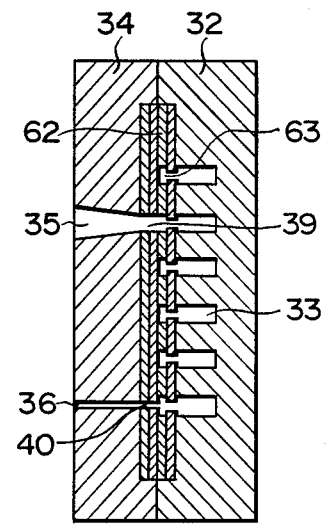
FIGS. 10 and 11 are longitudinal sectional views showing modification of the third embodiment.

Referring now to FIGS. 7 and 10, a third embodiment of the present invention will be described.

Figure 8:
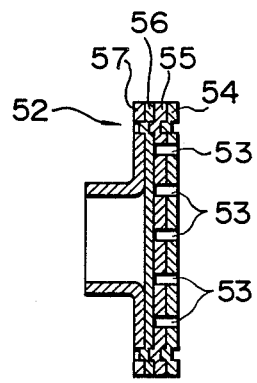
FIGS. 8 and 9 are longitudinal sectional views of end plate components for illustrating an end plate according to a third embodiment of the invention.

A description of those portions or components which are used in common in the first to third embodiments is omitted herein. As shown in FIGS. 7 and 8, end plate 52 of the third embodiment is a composite plate composed of four aluminum sheets 54, 55, 56 and 57. End plate 52 has spiroidal groove 53 and a boss (not shown in FIG. 7) on its front and rear faces, respectively. In this case, the width of groove 53 is substantially equal to that of a wrap.

Figure 9:
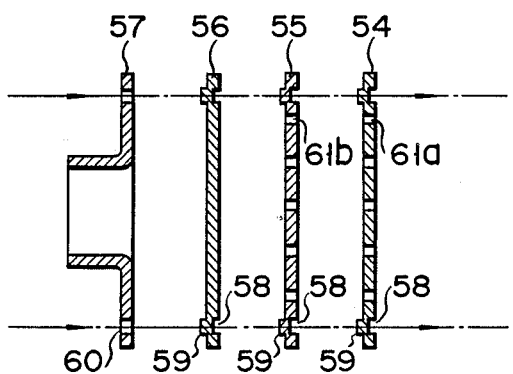

As shown in FIG. 9, spiroidal holes 61a and 61b are formed in sheet 54 and 55, respectively, by punching so that groove 53 is defined when sheets 54 and 55 are joined together. Sheets 54 and 55 and support sheet 56 each have recess 58 and projection 59 whose depth or height is half the thickness of each sheet. Thus, when all the four sheets are joined together, their recesses 58 and projections 59 and hole 60 are aligned with one another. If they are pressed in this state, sheets 54 to 57 are bonded and formed into an integral structure such that recesses 58, projections 59, and hole 60 engage one another. In this case, the diameter of these cut portions is made smaller enough than that of the wrap lest the compressed gas be by-passed via the engaging portions.

According to the third embodiment described above, even a deep groove can be formed accurately for the wrap.

A conventional composite plate (end plate), which is formed by brazing or welding, is subject to distortion by heating. According to the present invention, however, the sheets can be pasted together without being heated, so that the end plate can be formed without distortion.

As shown in FIG. 10, spiroidal hole 61a of plate 54 can be narrower than spiroidal hole 61b of plate 55, thereby to reduce the opening of groove 63, and thus changing the shape of groove 63 of end plate 62. In this case, the wraps and the end plate can be bonded more firmly to each other.

Moreover, a scroll member with a complicated shape can be accurately manufactured without a substantial distortion. Thus, there may be provided a compressor, pump or expander which can be reduced in torque fluctuation during operation, and produces less noise and vibration.

Figure 11:
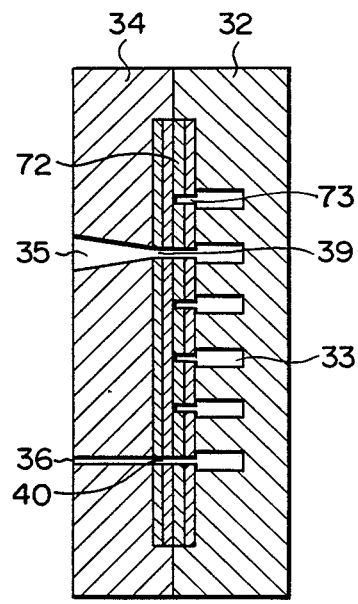

As is shown in FIG. 11, groove 73 of end plate 72 can be narrower than groove 33 of mold half 32.

As has been described above, the wrap can be made of one material selected from many, and the end plate can also be made of one selected from many. In other words, a variety of combinations of two materials for the wrap are the end plate are possible. The wrap and the end plate made of different materials, and slide better, one on the other , when lubricated with oil than when made of similar materials. Therefore, the wear of the wrap and the end plate can be minimized, and the loss of the orbiting torque of the scroll member decreases, whereby the scroll member is sufficiently reliable.

According to the present invention, furthermore, the injection molding permits the wrap to be formed and bonded to the end plate simultaneously, so that a high-accuracy scroll member can be produced easily and quickly. Thus, according to the invention, the scroll member can be manufactured at lower cost than in the case of the prior art manufacturing method in which the wrap is fitted into the groove.

What is claimed is:

1. A scroll member comprising:
   an end plate having a spiroidal groove on one side thereof, and a through-hole communicating with the groove; and
   a resin wrap joined to the groove of the end plate so as to protrude from the surface of the end plate,
   said wrap being formed by molding, and said through-hole and said groove being filled with part of said wrap.

2. A scroll member according to claim 1, wherein the width of said groove is substantially equal to that of the wrap.

3. A scroll member according to claim 1, wherein the width of said groove is greater than that of the wrap.

4. A scroll member according to claim 1, wherein the width of said groove is smaller than that of the wrap.

5. A scroll member according to claim 1, wherein the width of the bottom portion of said groove is greater than that of an opening thereof.

6. A scroll member according to claim 1, wherein said end plate is formed of a single plate.

7. A scroll member according to claim 1, wherein said end plate is a composite plate formed of a plurality of sheets bonded to one another.

8. A scroll member according to claim 7, wherein said plurality of sheets each have a recess and a projection having a diameter smaller than the width of the wrap, and are bonded together in a manner such that the respective recesses and projections thereof engage one another.

9. A scroll member according to claim 1, wherein said wrap is formed of liquid-crystal polymer resin.

10. A scroll member according to claim 1, wherein said end plate is formed of a metallic material.

11. A scroll member according to claim 10, wherein said end plate is formed of a metal material mainly containing iron.

12. A scroll member according to claim 10, wherein said end plate is formed of a metal material mainly containing aluminum.

13. A scroll compressor for compressing gas, comprising:
   a hermetically sealed housing having a discharge port and a suction port; and
   scroll compressing means disposed between the discharge port and the suction port,
   said scroll compressing means including a stationary scroll member and an orbiting scroll member for defining a plurality of compression chambers communicating individually with the discharge port and the suction port,
   each said scroll member including a metallic end plate having a spiroidal groove on one side thereof, and a through-hole communicating with the groove, and a resin wrap bonded to the groove of the end plate and protruding from the surface of the end plate,
   said wrap being formed by molding, and said through-hole and said groove being filled with part of said wrap.

14. A method for manufacturing a scroll member, comprising forming a spirodial groove on one side of an end plate, setting the end plate in mold means for defining the shape of a wrap, and injecting resin into the groove from an end plate side of the mold means with the end plate set thereby molding the wrap.

15. A method for manufacturing a scroll member according to claim 14, wherein said end plate has a passage connecting the groove and a side of the end plate opposite the one side, so that the resin is injecting into the groove through the passage.

16. A method for manufacturing a scroll member according to claim 14, wherein said end plate has a vent hole communicating with the groove.

17. A method for manufacturing a scroll member according to claim 14, wherein said end plate is formed of metal.

18. A method for manufacturing a scroll member according to claim 14, wherein said end plate is formed of resin.

19. A method for manufacturing a scroll member according to claim 14, wherein said wrap is formed of liquid-crystal polymer resin.

* * * * *